United States Patent [19]

De Jong et al.

[11] Patent Number: 4,624,873

[45] Date of Patent: Nov. 25, 1986

[54] END-DRESSING FOR TUBULAR CASINGS

[75] Inventors: Hugo De Jong, Lommel; Hugo Thijs, Hechtel, both of Belgium

[73] Assignee: Teepak, Inc., Oak Brook, Ill.

[21] Appl. No.: 800,476

[22] Filed: Nov. 21, 1985

Related U.S. Application Data

[63] Continuation of Ser. No. 559,165, Dec. 7, 1983.

[51] Int. Cl.⁴ ............................................. A22C 13/02
[52] U.S. Cl. ...................................... 428/36; 206/802
[58] Field of Search ..................................... 428/35, 36

[56] References Cited

U.S. PATENT DOCUMENTS 3,878,978 4/1975 Martinek ............................ 225/93.5
4,282,904 8/1981 Becker ................................ 138/109

Primary Examiner—Christopher A. Henderson
Attorney, Agent, or Firm—Howard M. Ellis; Michael L. Dunn

[57] ABSTRACT

Improved strands of sausage casings having their filling ends dressed have fewer failures as a result of loose tab-ends. Residual casing material remaining on the end of the casing from severing from other casing material is made to cling to the terminal end by the application of compressive force and heat in a sufficient amount to avoid fusion of the casing material.

3 Claims, 6 Drawing Figures

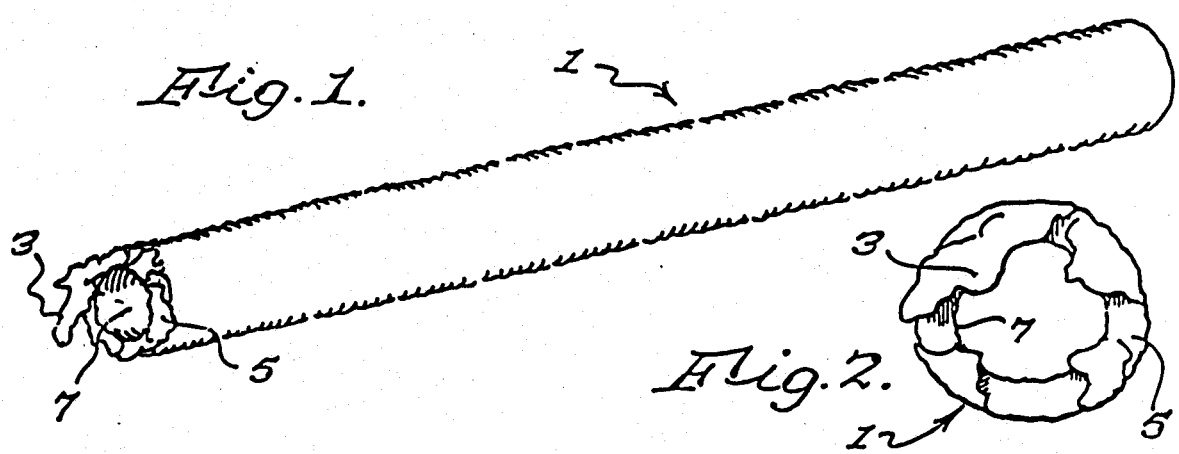
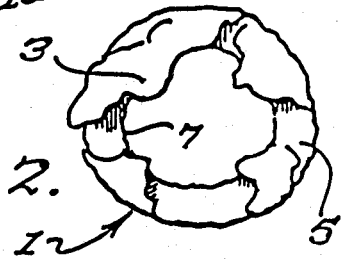
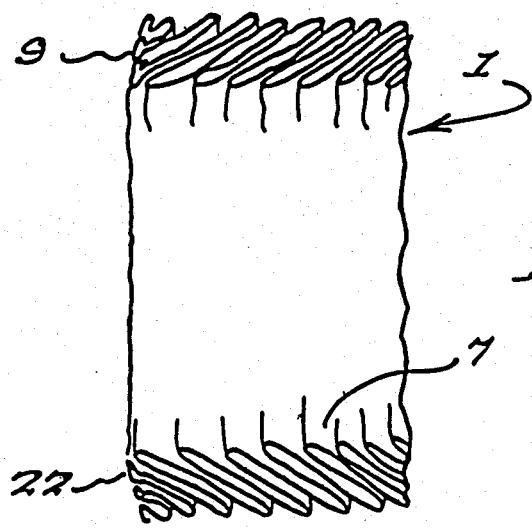
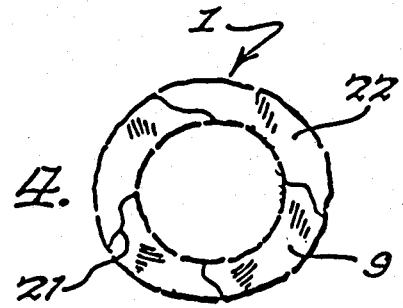
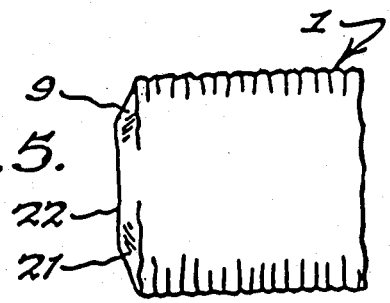
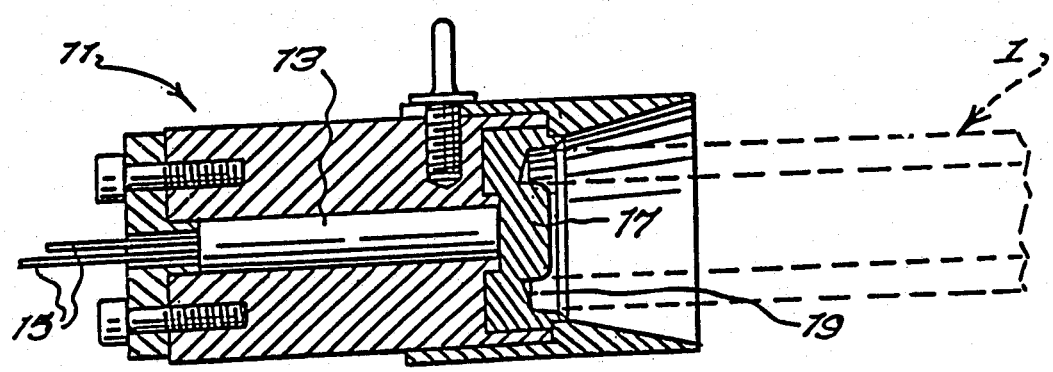

END-DRESSING FOR TUBULAR CASINGS

This is a continuation of Ser. No. 559,165, filed Dec. 7, 1983.

BACKGROUND OF THE INVENTION

The present invention relates to improved shirred or sheated strands of tubular food casings and methods of manufacture. More particularly, the present invention relates to sausage or meat castings having improved end-dressings which substantially reduce or eliminate filling equipment jamming due to interference by residual casing material or loose tab-ends.

Food casings, such as those made of regenerated cellulose and collagen have been widely used for a number of years in processing frankfurters, sausages, bologna, etc. For instance, the basic process for manufacturing small diameter casings of regenerated cellulose is known as the "viscose process" and is described in such patents as U.S. Pat. Nos. 2,999,756 and 3,835,113. Essentially, viscose is extruded through an annular die into a coagulating bath to form a tubular casing. The regenerated gel is impregnated with a plasticizer, dried and wound into flat reelstock. For convenience in handling and in filling such food casings, they are shirred on high-speed shirring machines, like those described in U.S. Pat. Nos. 2,010,626; 2,583,654; 2,722,714; 2,722,715; 2,723,201; and 3,451,827. In the shirring process, lengths of from 40 to 200 feet of casing are compacted into pleated strands of a few inches, e.g., 4–30 inches at a rate of 10 to 15 ft./sec.

As part of the shirring process, the strands must be severed, for example, from continuous reelstock from which they originated. Most of the methods for severing shirred artificial sausage casings routinely result in the formation of a loose or unshirred tab-like piece of residual casing material which remains at the horn insertion (tab) end of the strand. In the case of manual filling of sausage casings, the presence of such a loose tab at the horn insertion end can be rectified by the operator's manual dexterity and does not present a major problem. However, in high-speed, highly automated filling operations, the presence of a loose tab-end on the horn insertion end of a strand can have more major consequences. For example, a loose tab-end can interefere with the proper fitting of a strand onto the stuffing horn of a high-speed filling machine becoming entangled as the horn is inserted automatically into the strand. Under such circumstances, the strand can deshirr from both the filling and horn insertion end causing the process to jam, discharging meat into the filling station work area which means lost meat emulsion, as well as lost production output due to downtime. Accordingly, there is a need for improved tubular strands of food casings and methods of manufacture wherein the casings have end-dressings, which eliminate jamming and fouling when used in conjunction with high-speed automated filling equipment.

The present invention provides for more dependable end-dressed sausage/meat casings through the elimination of interfering residual casing material or loose tab-ends formed as by-products of shirring operations. By ironing down the tab-ends formed on at least one end of a severed shirred casing by application of heat to the terminal edge of the side-walls of a strand under controlled temperatures, the loose tab will cling and become an integral part of the casing side-wall. But, because the tab and adjacent casing pleats are not fused by the ironing process the casing will completely deshirr in a normal manner during filling operations as meat emulsion is forced into the strand thereby avoiding loss or waste of casing material.

Accordingly, it is a principal object of the present invention to provide more dependable, fail-safe strands of tubular food casing which are compatible for use on high-speed automated filling equipment.

It is a further object of the present invention to provide a method for making improved end-dressings on artificial sausage casings.

These and other objects, features and advantages of the present invention will become more apparent from the following more detailed descriptions.

SUMMARY OF THE INVENTION

The present invention provides for improved sausage casings having an end-dressing on the casing's tab (horn insertion) end which will not impede or interfere with the normal operation of automated filling equipment. Pleated casings coming off shirring machinery having residual casing material in the form of a loose tab-end usually resulting from the severing of strands are dressed by compressing the residual material against the terminal edge of the strand while heating at a temperature sufficient to cause the residual material to cling to the strand without causing fusion or degradation of the tab or pleated casing material. The tab is ironed against the side-walls of the terminal edge of the strand, and therefore, pay-out of the strand during filling operations is not impeded.

BRIEF DESCRIPTION OF THE DRAWINGS

FIG. 1 is a perspective view of shirred strand of casing with loose tab-end.

FIG. 2 is an end view of the casing of FIG. 1 with loose tab-end.

FIG. 3 is an enlarged sectional view of end-dressed casing of the present invention.

FIG. 4 is an end view of the casing with an end-dressing.

FIG. 5 is a side sectional view of the end-dressed casing of FIG. 4.

FIG. 6 is a side cross-sectional view of the strand inserted into an end-dressing unit.

DESCRIPTION OF PREFERRED EMBODIMENTS

Turning now to FIGS. 1 and 2, there is illustrated a strand of tubular casing 1, having a central opening or bore 7. The horn insertion terminal end of the strand has an edge 5 consisting of terminal pleats or folds of casing material. FIGS. 1 and 2 show the casing strand without an end-dressing after being severed from a longer shirred strand or flat reelstock, which strand may have been doffed and transferred to a strand handler of a shirring machine, and ready to be dressed. Hence, casing 1 has residual casing material in the form of a loose tab-end 3 remaining at the horn insertion terminal end as a by-product of being separated from other casing material.

The improved end-dressed shirred tubular casings and methods of manufacture as described herein are applicable to both edible and non-edible types. Typically, such casings are formed from regenerated cellulose or collagen of the kind used in the preparation of sausages, including frankfurters, etc. The concepts embodied herein are also applicable to virtually any shirred casing material, such as tubular films of amylose, starch, polyvinyl alcohol, alginates, cellulose derivatives, gelatin, casein, or plastic films like polystyrene, polyvinyl chloride, polyvinylidene chloride, polyolefins like polyethylene, polypropylene and polyesters, nylons, etc., whereby severing the casing material leads to the formation of undesired residual material at the end of the casing. In addition to casings having end-dressings on the tab end, i.e. the end of the strand to be inserted onto the stuffing horn of a filling machine, the invention also contemplates end-dressed strands having casing closures at the opposing end of the strand to prevent discharge of meat emulsion from the strand during filling operations.

The objective of eliminating the problem of loose tab-end 3 from the horn insertion end of the strand is achieved by compressing the residual casing material against the terminal edge of the casing wall 5 whereby a dressed-end is made without obstructing the central opening 7. The residual material is essentially ironed to the terminal edge of the casing by moderate compressive force applied against that end of the strand. The compressive force is applied in conjunction with sufficient heat to the terminal edge to cause the loose tab-end to cling to the terminal pleats without coming apart when the compressive force is removed. Likewise, when the dressed-end reaches ambient temperature conditions the ironed tab will continue to cling to the terminal pleats, but will release from the terminal pleats during filling. The elevated temperatures and exposure time should be preferably controlled to avoid conditions which will produce an adhering, adhesive or sticking affect of the tab-end to the terminal pleats of the strand as a result of either fusion, melting or degrading of the casing material. A temperature sufficient to produce a clinging affect is most advantageous in order not to weaken the casing wall and avoid rupturing and loss of meat emulsion during filling operations. Similarly, fusion or melting of the tab-end and terminal pleats can impede casing pay-out during filling reducing the amount of casing available per strand.

As previously indicated, the temperatures employed in making the end-dressing of the present invention should be controlled so as to produce a clinging affect. The actual temperatures utilized to achieve that affect are dependent on the particular casing material. Nevertheless, temperatures in the range of between about 150° and about 200° F. were found to be suitable in a number of instances. However, temperatures below 150° F. and above 200° F. may also be utilized provided the exposure time is appropriately adjusted. In this regard, it was found at the above temperatures the exposure time will range from about two to about four seconds. These intervals can, of course, be increased by adjusting the temperature downwardly or decreased by increasing the temperature. Thus, for example, it is possible to form an end-dressing on regenerated cellulose casings at temperatures of more than 200° F. provided the exposure time is reduced, for example, to two seconds or less. Accordingly, the determination of appropriate temperature and time intervals can be ascertained through the exercise of ordinary skill.

The end-dressings of the present invention can be made, for example, utilizing a heating unit 11 illustrated in FIG. 6, comprising a heating element 13 with electrical leads 15 to an appropriate temperature control thermostat (not shown). Heating element 13 conducts heat to a die surface 19 which has a inside diameter sufficient to circumscribe the edge of the shirred strand. The die surface may also include a rounded, convex-like surface centering support 17 which aids in centering and feeding the edge of the casing with loose tab-end 3 flush against the heated die surface 19. Support 17 fits inside central opening 7 of casing 1 to assure residual casing material is ironed against the strand without protruding into the central opening to become entangled on the stuffing horn of a filling machine when inserted thereon.

Heating unit 11 is shown equipped with a resistance-type heating element 13 which conducts heat to die surface 19. However, the invention also contemplates other means for transferring heat to the edge of the casing, including convection and radiation means, such as by use of infra-red rays, forced hot air or circulating a liquid heating medium to the die, e.g. oil.

The finished end-dressed casing according to the present invention is illustrated in FIGS. 3–5. The loose tab-end is shown ironed at 9 to the terminal end of the casing 1 clinging to the edge of the side-wall. The dressed-end 22 may have a generally glazed appearance 21. However, the color of the heated casing material does not vary from the balance of the strand indicating the absence of degradation. Correspondingly, the tab-end and adjacent pleats can be deshirred by hand indicating the absence of any fusion of the tab-end to the end pleats of the strand to one another thereby assuring proper pay-out of the casing during filling.

The present invention contemplates forming the end-dressings on shirred strands of casing by means of automated equipment. For instance, automated high-speed shirring machines may be equipped with a heating unit, such as illustrated in FIG. 6 whereby after a strand is shirred, severed, separated and doffed it may be transferred to a strand handler unit of a shirring machine which can be programmed with a cycle for compressing and removing the horn insertion end of the strand from the heating unit to form the end-dressing. Such operation can also be performed manually.

Although the invention has been described in considerable detail with respect to the preferred embodiments thereof, it will be apparent that the invention is capable of numerous modifications and variations to those skilled in the art without departing from the spirit and scope of the invention, as defined in the appended claims.

What is claimed is:

1. In a shirred strand of tubular food casing film wherein said strand has on at least one terminal end thereof loose, unshirred or residual casing film, the improvement which comprises the strand having an end-dressing at an affected terminal end, said dressing being formed from said loose, unshirred or residual casing film by compressing said loose, unshirred or residual casing film against the terminal edge of the shirred strand while heating to a temperature below the fusion temperature of said film, said loose, unshirred or residual casing material being secured to the terminal edge by ironing-onto said edge without adhesion, whereby the ironed-on loose, unshirred or residual casing material releases from said edge during filling.

2. The food casing of claim 1 wherein the end opposite the dressed end has an end closure to prevent loss of food emulsion during filling.

3. The food casing of claim 1 wherein the casing material is regenerated cellulose or collagen.

* * * * *